Patented Oct. 3, 1939

2,174,985

UNITED STATES PATENT OFFICE 2,174,985

PROCESS FOR THE ESTERIFICATION OF OLEFINS

Wilbur A. Lazier, New Castle County, Del., assignor to E. I. du Pont de Nemours & Company, Wilmington, Del., a corporation of Delaware No Drawing. Application March 2, 1937,
Serial No. 128,602

7 Claims. (Cl. 260—497)

This invention relates to the catalytic art, and more particularly to the art of direct esterification of olefins with organic carboxylic acids. Still more particularly it relates to the preparation of ethyl acetate by catalytic esterification of ethylene with acetic acid, and the use in this process of certain highly active solid contact catalysts.

As pointed out by Ellis ("Chemistry of Petroleum Derivatives", Chem. Cat. Co., Ed. 1934, pp. 320-331) the direct esterification of olefins with organic acids is difficult to accomplish. Numerous patents have been issued, however, disclosing processes for carrying out such esterifications in the liquid phase in the presence of mineral acids such as sulphuric, hydrochloric, or phosphoric acids, or their acid salts, or the chlorides, bromides, phosphates or sulfates of heavy metals. Notable among these are the Ellis patents, U. S. 1,365,050 to 1,365,052, inclusive, issued January 11, 1921; British Patent 398,527, issued December 15, 1931 to Strange and Kane; and U. S. Patent 2,006,734.

This invention has as an object to provide an improved catalytic process for esterifying olefins with organic carboxylic acids. A more specific object is the esterification of olefins with organic carboxylic acids over solid contact catalysts. A still more specific object is the catalytic synthesis of ethyl acetate from ethylene and acetic acid in the vapor phase. Other objects will appear hereinafter.

These objects are accomplished by the following invention which comprises bringing a gaseous mixture of an olefin and an organic carboxylic acid into contact with a solid dehydration-condensation catalyst at an elevated temperature and pressure.

The following examples set forth certain well-defined instances of the application of this invention. They are, however, not to be considered as limitations thereof since many modifications may be made without departing from the spirit and scope of the invention.

Example I

A catalyst consisting of phosphotungstic acid supported on silica gel was prepared in the following manner: 1200 cc. of 8–14 mesh silica gel granules were placed in a porcelain vessel and to it was added a solution prepared from 400 cc. of water and 400 g. of phosphotungstic acid crystals ($P_2O_5.24\ WO_3.XH_2O$). The mixture was evaporated to dryness at 100° C., after which the temperature was raised to 200° C. for several hours.

Forty cc. of the catalyst prepared as described was mixed with 120 cc. of 8–14 mesh fused silica serving as a diluent and heat transfer medium and charged into a pressure resistant steel tube. At a temperature of 225° C., an equimolecular mixture of ethylene and acetic acid under a pressure of 71 atmospheres was continuously passed over the catalyst at an inlet gas space velocity of 735 cc. (calculated to standard conditions of temperature and pressure) per cc. of catalyst per hour.

For each 100 grams of acetic acid introduced, there was obtained 142 grams of condensate containing 44% of ethyl acetate, 44% of unchanged acetic acid, and 6% of water.

In a similar experiment in which the gas space velocity was changed from 735 cc. to 1500 cc. per cc. of catalyst per hour, the concentration of ethyl acetate in the condensate was 38%.

Example II

A catalyst consisting of phosphotungstic acid supported on activated charcoal was prepared by adding a solution of 20 g. of phosphotungstic acid dissolved in 20 cc. of water to 60 cc. of activated charcoal, and evaporating the mixture to dryness at 150° C.

Forty cc. of the catalyst so prepared was mixed with 120 cc. of 8–14 mesh fused silica and placed in a pressure resistant steel tube and heated to 210° C. while passing over the catalyst at 67 atmospheres pressure an equimolecular mixture of ethylene and acetic acid at a gas space velocity of 730 cc. per cc. of catalyst per hour. For each 100 grams of acetic acid introduced, there was obtained 100 grams of condensate containing 35% of ethyl acetate and 49% of unchanged acid. The unchanged reactants are separated and returned to the reaction chamber.

Example III

A catalyst consisting of chrome-phosphoric acid supported on silica gel was prepared by heating to 230° C. a mixture of 23 g. of 85% phosphoric acid, and 10 g. of chromium nitrate. After cooling, the product was dissolved in 30 cc. of hot water, filtered, and the filtrate mixed with 60 cc. of 8–14 mesh silica gel granules and dried at 110° C.

Forty cc. of the above described catalyst was mixed with 130 cc. of fused silica granules of 8–14 mesh size, and charged into a pressure resistant vessel. An equimolar mixture of ethylene and acetic acid vapor at a pressure of 61 atmospheres was passed over this catalyst at a gaseous space velocity of 750, and at a temperature of 260° C.

For each 100 grams of acetic acid introduced there was obtained 114 grams of condensate containing 61.5% ethyl acetate, and 28.5% of unchanged acetic acid.

Various catalytic materials may be employed, principally those compounds usually characterized as dehydration or condensation catalysts among which are the difficultly volatile, non-oxidizing, inorganic acids and acid anhydrides, such as phosphoric acid, phosphorous pentoxide, or boric anhydride, distributed on suitable porous carriers such as silica gel or activated charcoal, other suitable catalysts are the oxides or salts of beryllium, magnesium, manganese, zinc, cadmium, aluminum, titanium, zirconium, tin, thorium, especially when combined with the non-oxidizing acids of low volatility. It is preferable, however, to employ as catalysts for this process certain complex inorganic substances characterized as the "heteropoly acids", and particularly those in which one component of the heteropoly acid is an element of subgroup A of the sixth group of the periodic table. Typical examples of these are: phosphomolybdic, boromolybdic, and silicomolybdic acids; phosphotungstic and silicotungstic acids; chrome-phosphoric acid and many others. It is particularly preferred to use phosphotungstic acid or chromephosphoric acid preferably deposited on a porous supporting material such as silica gel or activated charcoal, although other supports such as alumina, bentonite, kieselguhr, or asbestos may be employed.

Several methods may be employed for the preparation of the heteropoly acids. For example, an aqueous solution of ammonium tungstate and ammonium phosphate may be acidified with aqua regia, and evaporated. Crystals of phosphotungstic acid will then be deposited. An alternative catalyst is prepared by heating together phosphoric acid and chromium sesquioxide. For the preparation of complexes other than those containing phosphorous, Drechsil's well known ether extraction method is conveniently used. For instance, silicotungstic acid may be prepared by adding dropwise 150 cc. of concentrated hydrochloric acid to a boiling solution composed of 250 g. of $Na_2WO_4.2H_2O$ to which has been added 75 cc. of 40° Bé. sodium silicate. The mixture is filtered, 100 cc. of concentrated hydrochloric acid is added to the filtrate, and the silicotungstic acid present is extracted with ether. Evaporation of the ether solution to which a little water has been added, will yield hydrated crystals of silicotungstic acid.

As to the conditions of temperature and pressure to be employed in the vapor phase catalytic synthesis of esters from olefin and organic acids, the process may be operated in the temperature range of 150° to 350° C., and at pressures varying from 10 to 500 atmospheres. It is preferable, however, to operate in the range of 200° C., to 300° C., at 50 to 150 atmospheres. The preferred molar ratio of ethylene acetic acid is about 1:1 to 3:1, although a larger excess of ethylene may be used if desired.

Although the space velocity, expressed in terms of volumes of ethylene plus acid vapor at standard conditions of temperature and pressure, per volume of catalyst, per hour, may vary from 200 to as high as 10,000, it is convenient to operate at from 700 to 1500.

This process and the catalysts herein described may be applied not only to the esterification of organic acids with ethylene but also with other olefins such as propylene, the butenes, amylenes, hexenes and others as well as mixtures of acids and of olefins. The process, moreover, need not be restricted to the use of pure olefinic materials but may be operated with olefins mixed with other gases such as may occur in natural gas, or in the gas mixture derived from the distillation or cracking of petroleum or petroleum products, or from coal, oil shales, or other carboniferous material.

The organic acids used may comprise any desired volatile carboxylic acid such as acetic, propionic, butyric, isobutyric acids and the like, or mixtures thereof.

Although the direct esterification of olefins with organic acids is not new to the art, the methods by which this esterification has hitherto been accomplished have involved liquid phase batch processes. The method of the present invention disclosing as it does, for the first time, a continuous vapor phase process, offers the obvious economic advantages of continuous production at greatly increased spacetime yields, with materially reduced production costs. Further economies are effected in the isolation and purification of the ester products, and more efficient utilization of raw materials.

The novel and preferred type of catalyst employed in this invention, and comprising essentially the "heteropoly acids", possess the advantage of great resistance to the usual catalyst poisons such as hydrogen sulfide and organic sulfur compounds which frequently occur in the hydrocarbons obtained from petroleum or coal. They are characterized for the most part by high activity and long life, and are in general easily and cheaply prepared.

It is apparent that many widely different embodiments of this invention may be made without departing from the spirit and scope thereof and therefore it is not intended to be limited except as indicated in the appended claims.

I claim:

1. The process which comprises bringing an olefin and a saturated aliphatic monocarboxylic acid in the vapor phase in contact with a heteropoly acid catalyst at a temperature within the range of 150° to 350° C. and at pressure between 10 and 500 atmospheres.

2. The process in accordance with claim 1 characterized in that the reaction is carried out at a temperature of about 200° to about 300° C.

3. The process in accordance with claim 1 characterized in that the reaction is carried out at a pressure of about 50 to about 150 atmospheres.

4. The process which comprises bringing an olefin and a saturated aliphatic monocarboxylic acid in the vapor phase in contact with a heteropoly acid catalyst at a temperature within the range of 150° C. to 350° C. and at a pressure between 10 and 500 atmospheres, separating the unchanged reactants and recycling same in the process.

5. The process which comprises bringing the mixed vaoprs of an olefin and a saturated aliphatic monocarboxylic acid into contact with a heteropoly acid supported on a porous supporting material at a temperature of about 200° to about 300° C. and at a pressure of about 50 to about 150 atmospheres.

6. The process which comprises bringing ethylene and acetic acid in the vapor phase in contact with a heteropoly acid catalyst at a temperature within the range of 150° to 350° C. and at a pressure between 10 and 500 atmospheres.

7. The process for the esterification of olefins which comprises passing a gaseous mixture of an olefin and a saturated aliphatic monocarboxylic acid over a catalyst comprising a heteropoly acid supported on a porous supporting material at a temperature of about 200° to about 300° C. and at a pressure of about 50 to about 150 atmospheres, said gaseous mixture being passed at a space velocity of about 700 to about 1500 cc. of vapor per cc. of catalyst per hour.

WILBUR A. LAZIER.